Patented Feb. 16, 1937

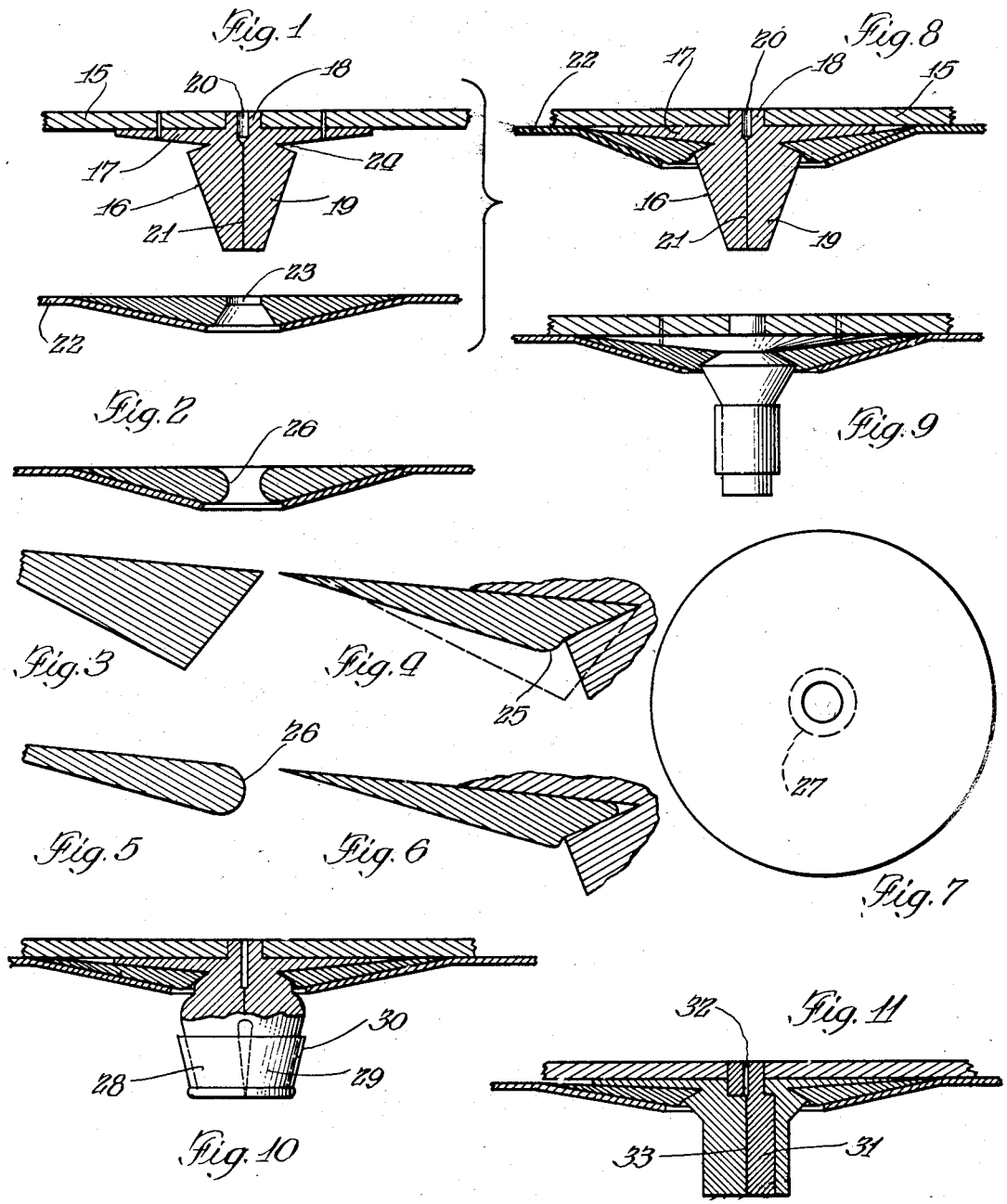

2,071,213

UNITED STATES PATENT OFFICE 2,071,213

BLADDER ATTACHMENT TO VALVES OF INFLATED ARTICLES AND THE LIKE

Ira D. Perry, Muskegon, Mich.

Application February 2, 1935, Serial No. 4,639

9 Claims. (Cl. 273—65)

This invention relates to improvements in bladder attachments to valves of inflated articles and the like. Such inflated articles as footballs, basketballs, soccerballs, inner tubes, for automobile tires, and the like and many other such inflated articles are such as may receive the features of the present invention, but in mentioning these particular articles I do not intend thereby to limit the usefulness or scope of the invention except as I may do so in the claims. Furthermore, the features of the present invention may be used in connection with both what may be called rubber valves and also metal valves.

One feature of the present invention is to provide a very simple and convenient form of connection between the bladder and the valve therefor, so that the bladder can be connected to and detached from the valve in very simple manner and with very little trouble; also to provide a construction whereby the valve can be attached to the casing of the inflated article permanently, and whereby the bladder can be removed from the valve itself for repair or otherwise, and whereby the bladder can thereafter be again connected to the valve in very simple fashion, and without the need of special attaching instrumentalities, and in perfectly airtight manner.

A further feature of the invention is to provide a construction such that the bladder can be made and sold as a complete and self-contained unit, ready for insertion in the casing, and with the attaching means for connection to the valve unit of the casing, thus making it possible to manufacture and sell the bladder units separate from the casing units, but with assurance that when they are afterwards assembled or put together they will establish the complete airtight valve structures needed and intended for the air-sealing operations. This will also make it possible to remove either the bladder unit or the casing and valve unit, and substitute another unit therefor, in case of defects developing in the unit for which substitution is to be made.

Another feature of the invention is to provide an arrangement such that the bladder is reinforced at the position of the valve which is to be connected thereto, such reinforcement taking the place of the usual reinforcement of other forms of device.

In connection with the foregoing features it is a further object to provide means for connecting the bladder and casing units and the valve, together, whether the valve be of rubber or of metal, and without the need of using cementing or vulcanizing operations, thereby simplifying the operations, and making it possible to make substitutions in simple manner, and without the need of using cementing or vulcanizing equipment.

Another feature of the invention relates to the provision of a rubber or resilient valve stem having therein a through extending air passage, together with means for compressing the valve stem to thereby close the air passage against outflow of air; such compressing means being peculiarly adapted to perform its sealing and closing function very advantageously and effectively. In this connection it is an object to provide an arrangement in which the valve stem is provided with an encircling groove or channel of a natural or normal size less than that of a compressing ring or member, both the valve stem and the compressing ring or member sometimes being of rubber or resilient material, or sometimes of relatively hard material such as metal so that when these parts are assembled a very strong and perfect sealing and compressing action is produced. In this connection the arrangement is such that the encircling ring must be stretched prior to insertion over the stem member, and during such stretching operation its thickness is reduced, so that when it again contracts into place within the groove or channel of the other member there is produced both a contracting action and also a crowding action of the ring against the faces of the groove or channel, with consequent improvement of the sealing action.

Sometimes the clamping ring is provided with a beveled clamping edge, and sometimes with a rounded or otherwise formed clamping edge, but in either case the action is such as just above explained.

Another feature of the invention is to provide an arrangement which is well adapted for use with various forms of valve stem heretofore known and used.

Other objects and uses of the invention will appear from a detailed description of the same, which consists in the features of construction and combinations of parts hereinafter described and claimed.

In the drawing, Figure 1 shows a section through a valve member connected to a casing, and through the adjacent portion of the bladder member and the clamping disk connected thereto, the parts being separated and in their natural or normal condition prior to stretching the clamping disk into place on the valve stem;

Figure 2 shows a section through a bladder section provided with a modified form of clamping ring for use with the valve stem of the casing of Figure 1;

Figure 3 shows a fragmentary section through the edge portion of the clamping ring in its normal or unstretched condition, and on enlarged scale;

Figure 4 shows a view similar to that of Figure 3 but with the ring clamped into the groove, showing how during this operation the thickness of the ring is reduced at the position of the groove thus producing an axial clamping action as well as a direct radial clamping action on the material of the valve stem itself;

Figures 5 and 6 show modified views similar to those of Figures 3 and 4 but with the use of clamping ring having its inner edge rounded instead of provided with a sharp inner edge;

Figure 7 shows a face view of the clamping ring or disk, with the hole thereof shown in normal or reduced size by full lines, and showing the stretched size of said hole by means of dotted lines;

Figure 8 shows an assembled sectional view of the parts of Figure 1 assembled together;

Figure 9 shows a view similar to that of Figure 8 but illustrating a modified form of valve stem;

Figure 10 shows a view of another form of valve stem provided with the features of the present invention, the stem of this figure being one which is now in common use in the trade; and Figure 11 shows a view similar to that of Figure 10 but illustrating still another form of stem which is well known in the trade.

This application, as to certain features herein disclosed is a continuation of my previously filed application for improvements in Bladder attachments to valves of inflated articles, Serial No. 743,103, filed September 7, 1934.

Referring first to Figures 1 and 8, the casing of the inflated article is designated by the numeral 15. This is the usual casing of the football, basketball, soccerball, tire or other inflated article, and is generally made of leather or other similar material. The valve member proper is designated by the numeral 16. It includes the disk 17 which is sewed or otherwise permanently attached to the inner face of the casing, and preferably there is a short lug or boss 18 reaching outwardly from the disk 17 and through a properly sized hole of the casing so that said lug or boss comes flush with the exterior of the casing as shown in the figures.

The valve member is also provided with an inwardly reaching stem portion 19 which reaches to the interior of the bladder (presently to be described), when the casing and bladder members are assembled together. There is preferably provided a short inwardly extending hole 20 in the boss or lug 18 and in alignment with the stem 19. There is also provided a very fine slit or longitudinal cut 21 reaching lengthwise through the stem from the hole 20 to the inner end of the stem, which slit or cut is too fine to allow flow of air therethrough under normal circumstances, but which slit or cut may be enlarged by insertion of the inflating tool or otherwise when it is desired to cause air to flow through the valve for inflation or deflation purposes.

The bladder is designated by the numeral 22. It is of rubber or other elastic material of usual form. This bladder is provided at the position of the valve stem with a hole to receive the valve stem, and said hole is preferably reinforced. The hole is indicated by the numeral 23. It is intended that the bladder and reinforcement shall be stretched prior to setting the valve stem through the hole 23, and then when the bladder and casing have been thus assembled, when the bladder is allowed to relax it will firmly grip the valve stem, and thus cause a compressing action to be exerted on the stem, with consequent improvement of the sealing action of the air passage through the stem.

The valve stem is provided with an encircling groove or channel 24 at the base of the stem, and close to the inner face of the disk 17, into which groove or channel the ring or bladder reinforcement enters. This groove or channel is preferably of relative-narrow or sharp angle, say thirty degrees as illustrated, when in its normal or relaxed condition. The hole of the bladder or ring is then made of greater angle of taper in its edge portion as shown in Figure 1 (lower portion), say sixty degrees, when relaxed or in its normal condition; and furthermore, the thickness of the edge of the hole of the ring or reinforcement is greater than that of the groove or channel, that is, the thickness of the edge of the hole is greater than the axial dimension of the groove or channel into which said ring is intended to be inserted; but when the bladder is stretched in order to enlarge its hole so that it can be set over the valve stem, there occurs a corresponding distention of the material of the bladder or ring so that it becomes thinner while thus distended or stretched, and becomes again thicker when allowed to again contract in diameter. Consequently, by stretching the ring or bladder sufficiently to enlarge the hole thereof to a point such that it can be set over the valve stem the edge material of the ring or bladder is so thinned that it can be seated into the groove or channel, and then when allowed to contract the material of the ring or bladder will crowd laterally into the groove or channel and produce a very tight engagement therewith. In this connection, the stretching of the ring or bladder also serves to reduce the angle of the edge portion of the hole to a degree which approximates the angle of the groove or channel, and then when the contraction occurs the edge of the ring or bladder will tend to again resume its former greater angle, with a still further clamping and sealing action against the edge of the hole in the ring or bladder.

Comparison of Figures 3 and 4 will emphasize the above mentioned action. In Figure 4 the normal angle of the edge portion of the ring or bladder is shown by dotted lines; and when it is stretched to receive the valve stem its thickness is reduced and the angle is also reduced to approximate that of the groove or channel; and then when the stretching action is relaxed the ring or bladder tends to bulge outwardly slightly as shown at 25 in Figure 4. In this connection, ordinarily the material of the valve stem is harder or stiffer than that of the ring or bladder, sometimes being of metal, so that the channel will more completely resist the clamping or forcing produced by the ring or bladder, and the edge of the latter will not restore completely to its former condition.

In Figure 2 I have shown a modified arrangement in which the hole of the ring or bladder is provided with a rounded edge 26. In this case an action similar to that already described is produced, and the relaxation of the ring or bladder produces both an axial compression as well as a direct radial compression against the groove or channel. In Figure 7 the dotted circle 27 indicates the enlargement of the hole when the ring or bladder is stretched to receive the valve stem.

The arrangements shown in Figures 9, 10, and 11 differ from that heretofore described chiefly in the details of the valve stem construction, and it is not deemed necessary to describe these valve forms in great detail herein. It may be mentioned, however, that in the form of Figure 9 the valve stem is straight; in that of Figure 10 the valve is provided with two outwardly flaring wings or portions 28 and 29 which are drawn together by means of the encircling band or ring 30, and that in the form of Figure 11 there is provided a central insert or section 31 in the valve stem, the hole 32 at the outer end of the stem registering with the surface of contact 33 between the main body of the stem and the insert aforesaid. When the inflating tool is inserted through the hole 32 it must find its way down between the insert and the main body of the stem as will be readily understood from examination of this figure.

I wish to emphasize the fact that one of the principal features of the present application resides in the provision of an arrangement such that there is produced a bite between the edge portion of the hole of the ring or bladder and the surfaces of the groove or channel, so that a very greatly improved sealing and contacting action is produced between these parts when the material of the ring or bladder is allowed to relax and contract against the groove of the valve stem. It will also be understood that when the bladder and casing carrying the valve stem are to be separated from each other, this may be readily accomplished by pulling the members apart, the material of the ring or bladder stretching sufficiently to permit this result to be attained.

While I have herein shown and described only certain embodiments of the features of my present invention, still I do not intend to limit myself thereto, except as I may do so in the claims.

I claim:

1. As a new article of manufacture, an air valve for the purpose specified, including a stem of rubber and having a longitudinally extending air passage therethrough, and also having an encircling groove around its central portion, said groove being of relatively small or narrow or restricted angle, together with a ring of elastic material having a central opening of normally smaller size than the root of the groove and having the edge of said central opening of normally larger or broader angle than the angle of the groove, whereby when the ring is stretched to enlarge the opening thereof sufficiently to permit insertion of said ring over the stem of the valve the opening of the ring is enlarged and the thickness of the material of the edge of the opening is reduced and the angle of said edge is reduced to permit entry of the edge of the ring opening into the groove, and whereby when the ring is thereafter permitted to contract into the groove the edge portion of the ring opening becomes thicker and its edge angle enlarges or broadens to thereby firmly engage the groove, substantially as described.

2. As a new article of manufacture, an air valve for the purpose specified, including a stem of rubber and having a longitudinally extending air passage therethrough, and also having an encircling groove around its outer portion, said groove being normally of a given cross-section of relatively small angle, together with a ring of elastic material having a central opening of normally smaller size than the root of the groove, an edge portion of said central opening being normally of a larger cross-section than the cross-section of the inserting end of the stem, whereby the central opening portion of the ring of minimum diameter is caused to stretch sufficiently to receive the stem and thereafter to contract and wedge firmly into the groove to forcibly compress the grooved portion of the stem radially of the central opening.

3. As a new article of manufacture, an air valve comprising complementary detachable stem, and ring portions, the material of the stem being of rubber at one location, and said stem being provided with an encircling groove at said location, said groove being of a given cross-section of relatively small angle at said location, and the ring portion compressing a thickened wall portion of an article to be inflated and having a central opening and being of elastic material at the position of said opening, said central opening being of normally smaller size than the root of the groove aforesaid, and an edge portion of said central opening being of normally greater cross-section than the stem adjacent the groove, whereby when the ring is stretched to enlarge the edge portion of the central opening sufficiently to receive the stem the cross-section of the central opening is reduced and contracted into wedging engagement with the walls of the groove to compact the elastic material of the stem radially.

4. As a new article of manufacture, a valve for the purpose specified, comprising complementary detachable stem, and ring portions, the stem being provided with a radially enlarged portion and an encircling groove of given cross-section of relatively small angle adjacent said enlarged portion, and the ring portion being provided with a central opening, and being of rubber at the position of said opening, said opening being of normally smaller size than the stem at the position of the groove, and the edge portion of the central opening being of normally thicker size and normally greater cross-section than the groove, whereby the elastic material surrounding the central opening in the ring is caused to stretch on insertion of the stem therethrough and then contract within and forcibly compress the grooved portion of the stem radially from the adjacent enlarged portion.

5. The combination with an inflatable article including a bladder and a casing therefor, of valve means for said article, said valve means including a rubber stem extending inwardly from the casing and secured thereto, there being a longitudinally extending passage through said stem, and there being an encircling groove around said stem close to the interior surface of the casing, and the bladder having a thickened rubber portion in which an opening for the accommodation of the stem is provided, said opening being of normally smaller size than the cord of the groove in the stem and tapering outwardly therefrom, whereby the thickened material of the bladder surrounding said opening is caused to wedge within the annular grooved portion of the rubber stem and compact the material thereof radially of its central opening and prevent the passage of air therethrough.

6. The combination with an inflatable article including a bladder and a casing therefor, of valve means for said article, comprising means for securely connecting the casing and bladder together, said valve and connecting means including a stem securely connected to the casing and projecting inwardly therefrom and having a longitudinally extending through air passage, and also having an encircling groove around said shank or stem close to the inner surface of the casing, said groove being of generally angular cross-section with its angle of given normal degree, and the stem being of one degree of hardness at the position of said groove, and the bladder being of rubber, and having an opening for accommodation of the stem, said opening being normally of size smaller than the stem, and the edge portion of said opening being of generally angular cross-section with the normal angle of greater degree than the angle of the groove, whereby when the bladder is stretched to enlarge the opening thereof to receive the stem the angle of the edge portion of the opening becomes of reduced degree of angle to enter the groove, and when the bladder is thereafter permitted to contract the edge portion of the opening expands angularly into the groove to thereby produce a very tight and firm connection between the parts, substantially as described.

7. Connecting means between the casing and bladder of an inflatable article, including a stem on either one of said parts and there being an opening in the other of said parts to receive said stem, said part having said opening being of rubber, there being an encircling groove in the stem of generally angular cross-section, and the edge portion of the opening being of generally angular cross-section and smaller size than the stem at the position of the groove, the degree of the angle of the groove being less than the normal degree of the angle of the edge portion of the opening, substantially as described.

8. Connecting means between the casing and bladder of an inflatable article, including a rubber valve acting stem on either one of said parts, and there being an opening in the other of said parts to receive said stem, said part having said opening being of rubber at the position of said opening, the stem being provided with an encircling groove to receive the wall of the opening in said other part, and the root of the groove being of greater transverse dimension than that of the opening and the material surrounding the opening being of greater thickness than the width of the groove, whereby when the parts are contracted together the material surrounding the opening expands into the groove with very tight and firm connection between the parts compacting the material of the valve acting stem and preventing the escape of air therethrough, substantially as described.

9. As a new article of manufacture, an air valve for bladders of playballs and the like including a rubber stem having a longitudinally extending substantially closed passageway therethrough and an encircling groove around its outer portion, said groove being of relatively small dimensions, and means for compressing and compacting the root portion of the grooved stem, comprising a stretched elastic element encircling the stem and wedged into and substantially filling said groove and exerting radial pressure upon the stem at the root of the groove, whereby escape of air through said passageway is prevented.

IRA D. PERRY.